United States Patent [19]

Robinson

[11] 4,271,888

[45] Jun. 9, 1981

[54] CLIP-ON SNOW CHAINS

[76] Inventor: Wade C. Robinson, 2001 Concord La., District Heights, Md. 20028

[21] Appl. No.: 5,850

[22] Filed: Jan. 23, 1979

[51] Int. Cl.³ .................. B60C 27/00; B60C 27/12
[52] U.S. Cl. ........................... 152/234; 24/201 A; 24/201 C; 152/233; 152/236; 24/299; 24/380
[58] Field of Search .............. 152/213 R, 213 A, 216, 152/231, 232, 233, 234, 235, 220–230, 373, 236, 237, 238; 24/73 AC, 73 CE, 73 SB, 116 R, 230.5 AD, 201 A, 201 C, 201 R

[56] References Cited
U.S. PATENT DOCUMENTS

| 1,764,785 | 6/1930 | Frykman | 152/232 X |
| 2,729,262 | 1/1956 | Lohmiller | 152/233 |

FOREIGN PATENT DOCUMENTS 350846 6/1931 United Kingdom .................. 152/228

Primary Examiner—John T. Goolkasian
Assistant Examiner—Thomas Bokan
Attorney, Agent, or Firm—Burns, Doane, Swecker & Mathis

[57] ABSTRACT

A snow chain assembly having a pair of cross-chains is connected with a wheel assembly by a pair of connecting devices. One connecting device includes a lug mounted to the inside of the wheel and a cooperating socket plate that receives the lug and is secured thereby. The second connecting device includes a T-shaped radial slot and a T-shaped pin connected to the chain. When the pin is inserted in the slot and moved radially outward, the slot prevents disengagement of the pin. Spring biased retaining members may be attached to the wheel as locks to further prevent chain disengagement.

10 Claims, 13 Drawing Figures

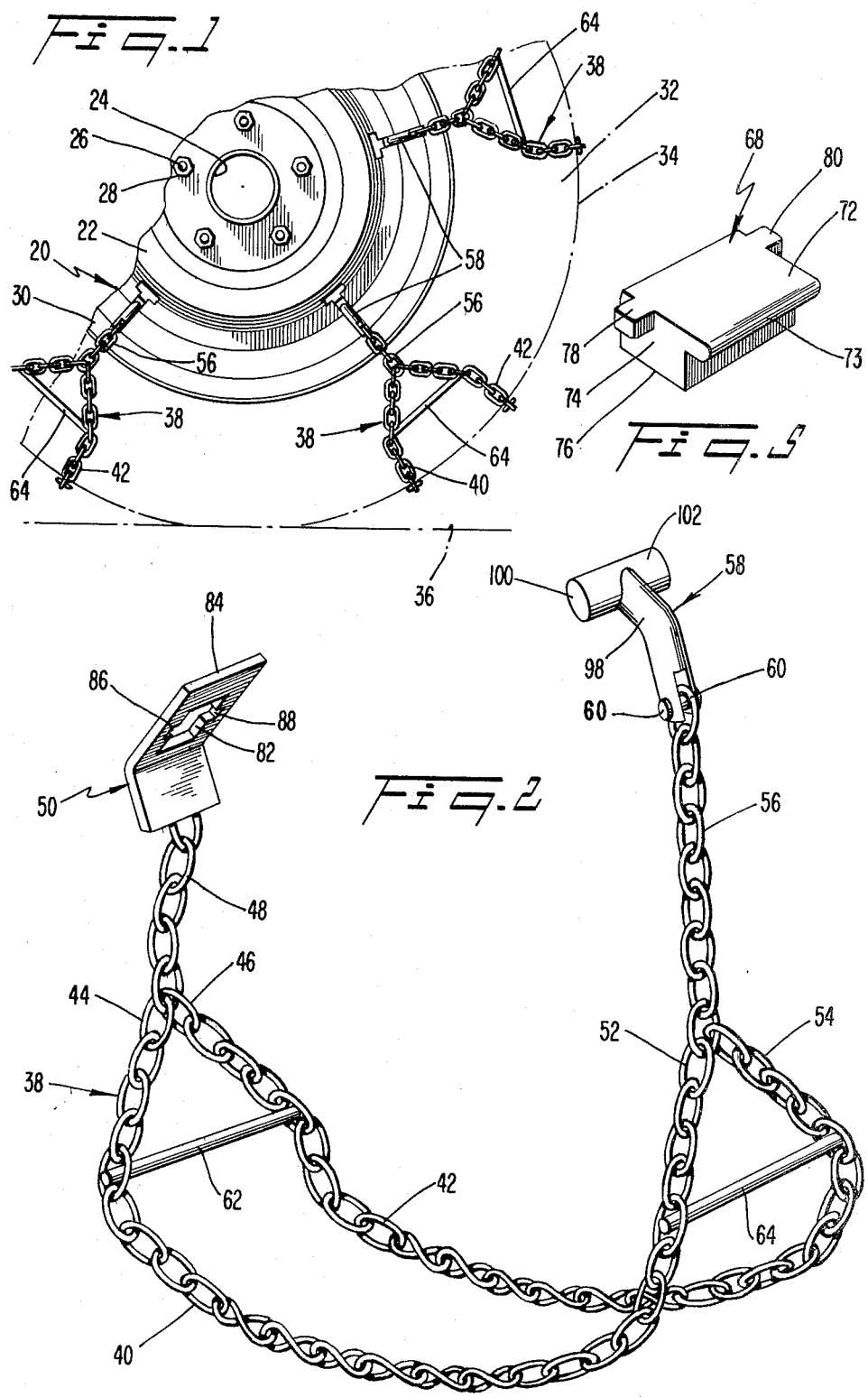

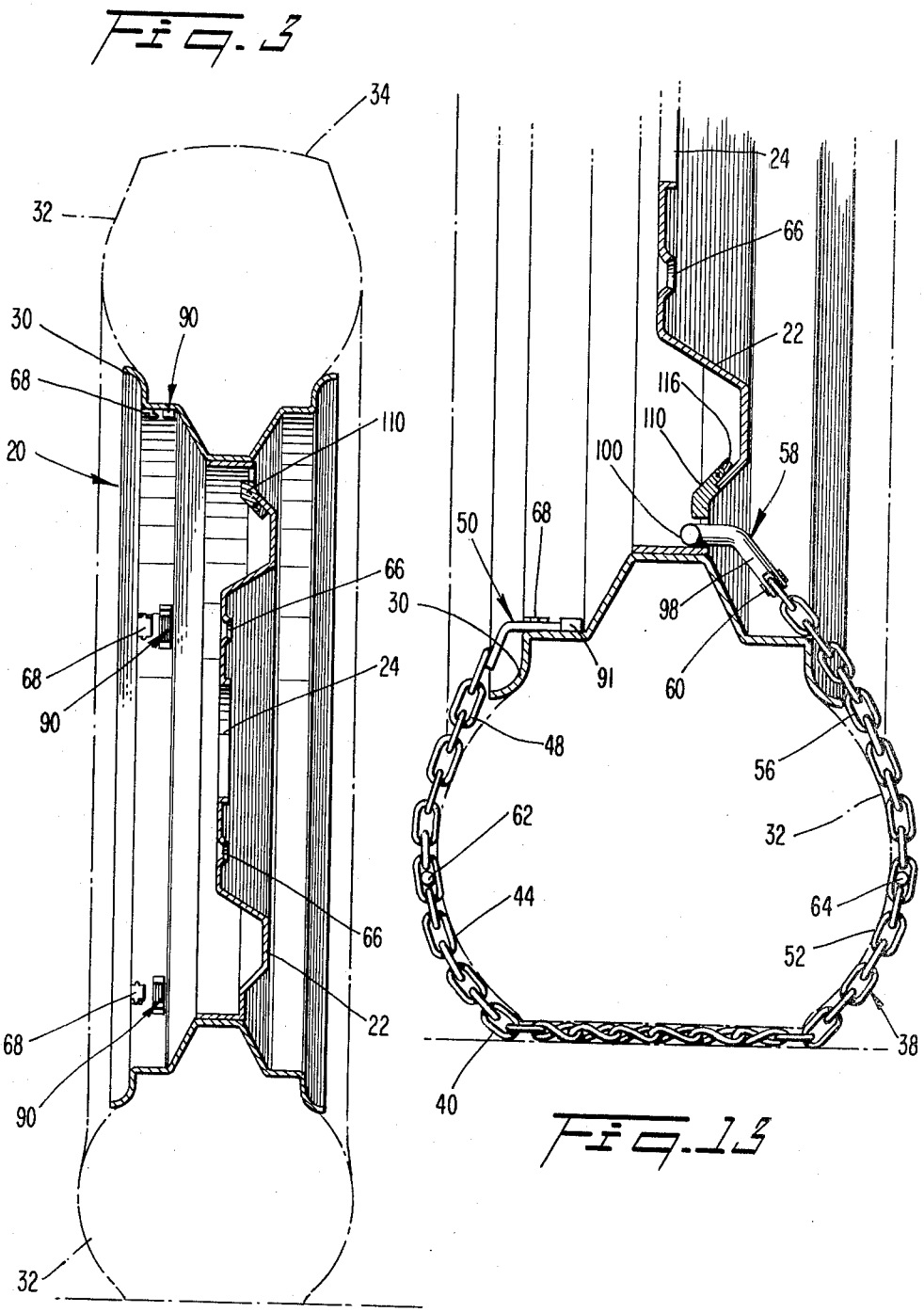

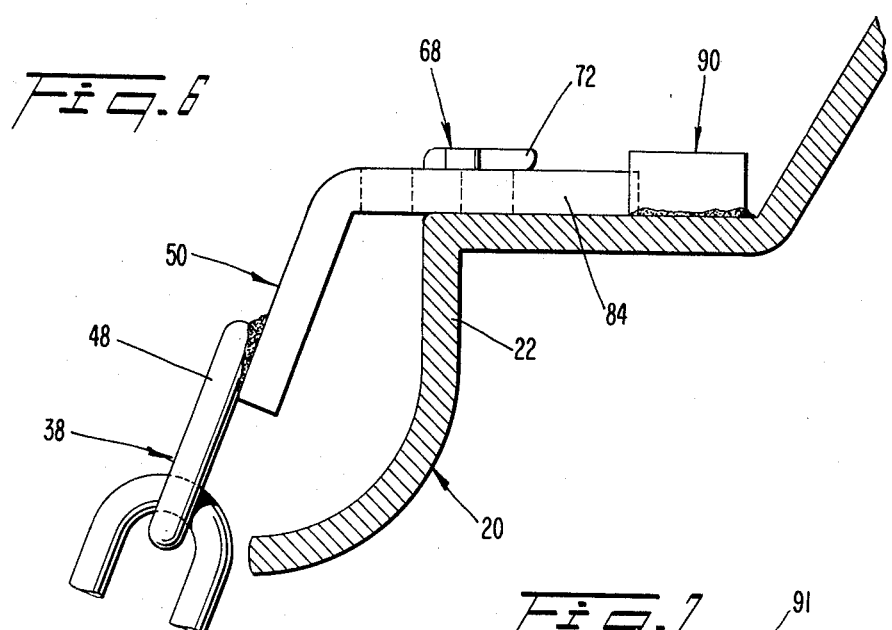
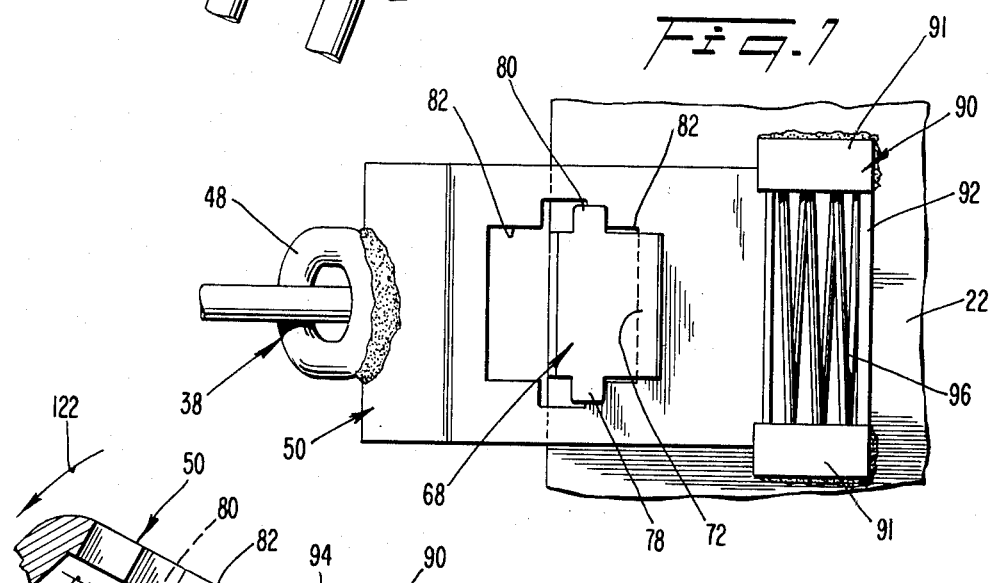
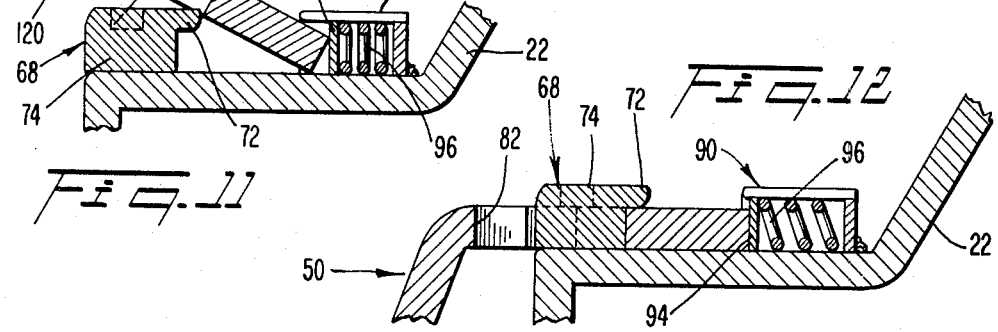

CLIP-ON SNOW CHAINS

BACKGROUND OF THE INVENTION

The present invention relates generally to devices for increasing the traction between a vehicle wheel and a supporting surface. More particularly, the present invention concerns an improved assembly for quickly and easily attaching a snow chain to a vehicular wheel and tire assembly.

In those climates where a significant snowfall occurs during the winter months, snow accumulations frequently become packed on road or highway surfaces causing slippery hazardous driving conditions. Driving conditions can also be dangerous when rain falls during the cold season and ice forms on highway surfaces. The effects of ice and accumulated snow on the traction between a vehicle tire and the road surface are well known. In fact, it is widely recognized that snow chains provide the best means for significantly increasing the traction between the vehicle tire and the road surface during such slippery conditions.

The early designs for traction enhancing tire chains include a pair of generally parallel side chains having a plurality of cross-chains extending between the side chains. The side chains are disposed one on each side of the tire. When the ends of each side chain are connected to one another, there is an endless chain on both the inside and outside of the wheel assembly with the cross-chains extending across the load bearing surface of the wheel assembly.

Such chains are difficult for drivers or vehicle operators to install. For example, it is often necessary or desirable to elevate the wheel assembly off the ground so that the two ends of each side chain can be easily connected together. If the vehicle is not elevated, it then becomes necessary to reach around the tire with both hands in order to grasp and manipulate the two free ends into their connecting arrangement. The outside chain, i.e., on the readily accessible side of the wheel assembly, can be fairly easily connected once the inside chain is secured. Since the chains are necessarily heavy and sometimes requires manipulation in order to distribute the cross-links around the circumference of the wheel assembly, such an arrangement requires manual dexterity in the individual installing the chains and preferably some degree of experience.

During operation of these chains, there is no connection between the chain and the wheel assembly itself. Thus, and, under some circumstances, the chain itself is free to slip relative to the wheel assembly. More significantly, if a side chain should break, the entire chain may be lost.

Another type of chain assembly is also available in which each of a plurality of cross-chains is provided with a substantially inextensible strap and buckle connection for the ends. To install these cross-chains, it is necessary to thread one end of the strap through an aperture in the wheel assembly and connect the other end to the strap. This arrangement is objectionable for several reasons. It is possible for the chain to move relative to the tire assembly in a direction circumferential to a radial cross-section of the tire. Moreover, the number of cross-chains is limited by the number of available apertures in the wheel assembly. Accordingly, a limited amount of traction is available. In addition, the straps are abraded by the aperture edges. Thus, the straps can be weakened to such a degree that they sever and the cross chain is lost. Certainly, such cross-chains are unsuitable for prolonged use.

Another problem with the conventionally available chain assemblies is the lack of universality. More particularly, since different wheel and tire sizes give rise to different tread widths and different tire circumferential lengths, tire chains must be stocked in a variety of nominal sizes to permit use with the wide variety of tires used on domestic, foreign and commercial vehicles. This problem is particularly important to the retail outlets which stock the chains for resale to consumers.

In view of the foregoing discussion, it is apparent that the need continues to exist for an easily attached cross-chain assembly which overcomes problems of the type discussed above.

SUMMARY OF THE INVENTION

A traction enhancing assembly for a vehicular wheel assembly includes a tire chain assembly having a pair of connecting devices, one disposed at each end of the chain. One of the connecting devices cooperates with a corresponding lug mounted on the inside of the wheel; whereas, the other connecting assembly cooperates with a cooperating device accessible from the outside of the wheel assembly.

In order to enhance traction capability, each chain assembly preferably includes a pair of cross-chains joined near their respective ends and attached to the associated connection device. To space the pair of cross-chains circumferentially with respect to the wheel assembly, a pair of spacing links is provided, each link being disposed on a corresponding side of the wheel assembly. Each link is connected to both cross-chains so as to rigidly space the two cross-chains along the tire circumference.

The lug on the inside of the wheel defines a key having a tongue projecting circumferentially away from the bearing surface of the wheel assembly. The chain preferably includes a cooperating mounting plate having a keyway designed to conform with the external contour of the lug and tongue. Mounting plate thickness is selected so that relative movement is permitted between the lug and the mounting plate so that the mounting plate can be retained under the tongue.

To further assist retention of the mounting plate on the lug, the lug may be provided with a pair of ears and the mounting plate may be provided with conforming recesses designed to cooperate with the ears during connection of the mounting plate to the lug. After relative movement between the mounting plate and the lug, the ears provide additional lateral support points to eliminate twisting of the mounting plate relative to the lug.

Each wheel assembly may also be provided with a retaining assembly adjacent to each lug. The retaining assembly includes a resilient member that is compressed when the mounting plate is positioned on the lug. The retaining assembly preferably includes a channel into which the tongue projects and into which the mounting plate must be pushed against a compression spring. The spring pushes the mounting plate into tight engagement beneath the tongue of the lug.

To secure the second end of each chain assembly on the outside of the wheel assembly, a generally radially extending slot is provided through the wheel assembly and a cooperating pin is provided on the chain assembly. The pin includes a pair of lateral projections which prohibit the pin from being pulled out of the slot. In one embodiment, the slot takes a T-shaped configuration and the pin has a T-shaped head.

To avoid accidental release of the pin, a retaining plate may be hingedly mounted to the interior side of the wheel assembly so as to partially fill the radially innermost part of the slot. Such a retaining plate may be mounted on a spring hinge so that when the cooperating pin has been inserted, it cannot inadvertently move to a radially inner portion of the slot and inadvertently free itself.

BRIEF DESCRIPTION OF THE DRAWINGS

Many objects and advantages of the present invention will be apparent to those skilled in the art when this specification is read in conjunction with the attached drawings wherein like reference numerals have been applied to like elements and wherein:

FIG. 1 is a partial view of a wheel assembly having chains mounted in accordance with the present invention;

FIG. 2 is an enlarged perspective view of a tire chain in accordance with the present invention;

FIG. 3 is a cross-sectional view taken through the wheel assembly;

FIG. 4 is an elevational view of the inside of the wheel assembly;

FIG. 5 is an enlarged perspective view of a chain mounting lug;

FIG. 6 is an enlarged partial cross-sectional view of the inside chain connecting device;

FIGS. 11 and 12 illustrate the sequence of connecting the inside chain end to the wheel; and FIG. 13 is an enlarged cross-sectional view through a wheel assembly showing the chain installed.

DESCRIPTION OF THE PREFERRED EMBODIMENTS

Figure 7:
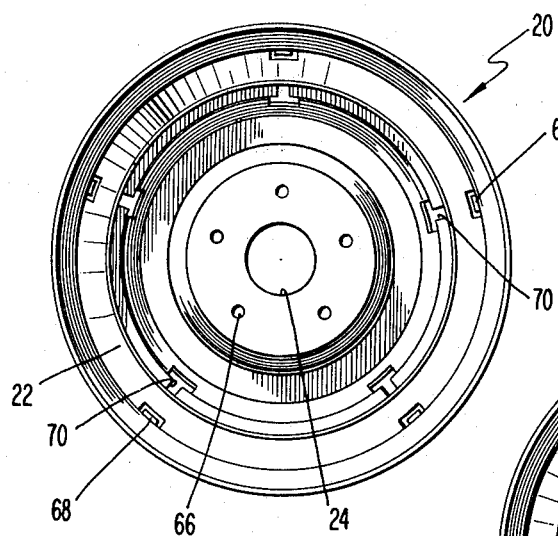
FIG. 7 is an enlarged partial plan view of the connecting assembly of FIG. 6.

In reference to FIG. 1, a wheel assembly 20 is illustrated which includes a steel rim 22 adapted for mounting to a vehicle such as an automobile. In this connection, the rim 22 has a center 24 and a plurality of spaced apart apertures to receive studs 26 of the vehicle. The rim 22 is securely connected to the vehicle by means of a plurality of bolts 28 which are threaded onto the studs 26 and tightened in a conventional manner.

Mounted on the periphery 30 of the rim 22 is a suitable conventional pneumatic tire 32. The tire 32 has a peripheral bearing surface 34 which supports the wheel assembly 20 as well as the associated vehicle relative to a supporting surface 36 such as a road or highway.

To enhance the traction between the bearing surface 34 and the supporting surface 36 during operation of the vehicle in slippery conditions, a plurality of traction chain assemblies 38 are mounted on the rim or wheel 22. Preferably, there will be five of these chain assemblies since a greater number of chain assemblies provides a smoother vehicle ride.

CHAIN ASSEMBLY

Each chain assembly 38 is identical. Accordingly, it will suffice to describe only one of the chain assemblies in detail. The chain assembly 38 (see FIG. 2) includes a pair of cross-chain portions 40, 42 having twisted links at least between the tire tread and the road. A first end 44, 46 of each cross-chain portion 40, 42, respectively, is connected to one chain end portion 48. The chain end portion 48 in turn is connected to a mounting plate or socket plate 50. Each chain portion 40, 42 also includes a second end 52, 54 each of which is connected to a second chain end portion 56 that carries a pin assembly 58. The pin assembly 58 may be welded to the end link 60 of the chain end portion 56 or, in the alternative, may be connected with the chain by a bolt 61.

The use of a bolt connection with the chain 56 permits the pin assembly 58 to be connected to either the end link or a link of the chain adjacent to the end so as to provide ajustability in the length of the chain assembly 38 when it is wrapped around the loadbearing surface of the wheel assembly 20.

In order to space the two cross-chain portions 40, 42 from one another circumferentially with respect to the wheel, each chain assembly 38 also includes a pair of spacer links or bars 62, 64. Each end of each spacer link is welded or otherwise suitably connected to a corresponding one of the cross-chain portions 40, 42. In this manner, a rigidly fixed spacing is defined and maintained between the cross-chain portions 40, 42 during use of the chain assembly on the wheel assembly.

Returning briefly to FIG. 1, it will be seen that the spacer links 62, 64 are positioned on the chain assembly 38 so as to be located on a side portion of the wheel assembly 20. In this manner, the spacer links do not directly engage the supporting surface 36 and are not subjected to cyclic bending forces as the wheel assembly rotates.

WHEEL ASSEMBLY

The wheel assembly 20 (see FIG. 3) includes a plurality of mounting apertures 66 which are circumferentially spaced (see FIG. 4) at a common radius from the wheel center 24. These apertures receive the bolts 26 (see FIG. 1) of the vehicle axle assembly.

The inside of the rim 22 (see FIG. 4) is also provided with a plurality of mounting lugs 68. These mounting lugs 68 are circumferentially spaced about the wheel assembly 20 along a common radius from the wheel center 24. As illustrated, five lugs 68 may be provided and spaced by equal circumferential distances around the wheel assembly 20. Naturally, it is within the contemplation of this invention that the number of wheel lugs may be greater than five.

It will also be noted from FIG. 4 that a plurality of slots 70 are also provided in the rim 22 of the wheel assembly 20. Each slot 70 includes a predominately radially extending slot portion. The plurality of slots 70 corresponds in number to the plurality of lugs 68. Moreover, the slots 70 are circumferentially spaced along a common radius in general radial alignment with the associated lugs 68. The primary reason for this radial alignment is to permit a minimum length of cross-chain to be used for each associated pair of lugs 68 and slots 70.

INSIDE CONNECTION DEVICE

The inside connection device is illustrated generally in FIG. 6. The device includes the mounting plate 50 and the lug 68 which is mounted on the interior surface of the wheel rim 22. This mounting plate 50 is sharply angular so that the attached chain assembly is carried close to the wheel.

The lug 68 may be generally rectangular in plan view (see FIG. 5) so as to include a tongue portion 72 having a rounded bottom edge 73 that projects from a base portion 74. The base portion 74 is adapted to be mounted directly to the wheel rim 22 and may be provided with a curvature on its bottom surface 76 that conforms to the radius of curvature of the wheel rim at the intended place of attachment. In this manner, the lug 68 can be mounted to the wheel by a seam-weld extending around the periphery of the base surface 76.

As best seen in FIG. 5, the tongue 72 is vertically spaced from the bottom surface 76 so as to be positioned above the wheel rim 22. Accordingly, a space is defined which has a depth sufficient to receive the thickness of the mounting plate 50. The rounded bottom edge is designed to reduce clearance during attachment of the mounting plate 50.

In connection with FIG. 6, it will be seen that the space under the tongue 72 freely receives the mounting plate 50 between the tongue 72 and the wheel surface. Moreover, it will be observed that the tongue 72 is directed away from the chain assembly 38 and the bearing surface of the wheel assembly 20 so as to provide a mechanical stop to prevent the chain assembly 38 from being disengaged from the wheel.

The lug 68 (see FIG. 7) may also include a pair of laterally projecting ears 78, 80 which extend in a direction generally perpendicular to the orientation of the tongue 72, i.e., circumferentially of the wheel. Each ear 78, 80 is preferably disposed on a different side of the tongue 72.

In order to connect the chain assembly 38 to the lug 68, each mounting plate 50 (see FIG. 2) is provided with a generally rectangular aperture or keyway 82. The peripheral contour of the aperture 82 is selected to conform to the external configuration of the lug 68 (see FIG. 5) but is dimensioned so as to provide a slight clearance therearound. Accordingly, the mounting plate 50 (see FIG. 2) can be positioned on the lug 68 (see FIG. 6) by inserting the lug assembly 68 through the aperture 82 and subsequently sliding the mounting plate 50 relative to the lug 68 so that the mounting plate 50 has an end portion 84 which underlies and is retained by the projecting tongue 72.

The aperture 82 may also be provided with conforming recesses 86, 88 to accommodate the pair of laterally projecting ears 78, 80 of the lug 68. Thus, the ears 78, 80 do not interfere with the connection of the mounting plate 50 to the lug assembly 68. However, when the mounting plate 50 and the lug 68 are engaged, the ears 78, 80 provide some additional lateral stability to the connection and prevent the mounting plate from twisting relative to the lug and possibly causing damage thereto.

While the mechanical connection between the socket plate 50 and the lug assembly 68 will ordinarily be sufficient to maintain the connection between the chain assembly 38 and the wheel assembly 20 (see FIG. 6), a retainer assembly 90 may also be provided for each lug 68. The retainer assembly 90 may include a pair of laterally spaced angle members 91 (see FIG. 7) each of which is welded or otherwise suitably secured to the wheel rim 22 to define an internal channel in general radial alignment with the tongue 72 of the associated lug 68. So that the retaining assembly 90 can accommodate the mounting plate 50 during connection, the internal channel defined by the angle members 91 has a vertical height at least corresponding to the thickness of the mounting plate 50. Moreover, the width of the internal channel must exceed the width of the mounting plate 50.

The retaining assembly 90 is preferably positioned to be spaced from the end of the tongue 72. In addition, the retaining assembly 90 may include a moveable plate 94 which is biased into engagement with the tongue 72 by one or more compression springs 96 acting against an abutment 92 between the angle members 91. With this arrangement, the mounting plate 50 is resiliently biased into contact with the body portion of the lug assembly 68 by the compression springs 96. Thus, during connection and disassembly of the chain assembly 38 to the lug 68, the retaining member 90 accommodates movement of the mounting plate 50 relative to the lug 68. Moreover, during operation of the wheel assembly 20 with the traction enhancing chain assemblies 38 installed, the plurality of retaining members 90 will prevent the inside end of the chains 38 from becoming inadvertently disengaged from this first connection device.

It is to be noted here that an identical connection device may be provided for connecting the outside end of the chain assembly to the wheel rim 22, if desired. However, in this preferred embodiment, a different arrangement is used for the outside end of the chain assembly.

OUTSIDE CONNECTION DEVICE

Figure 8:
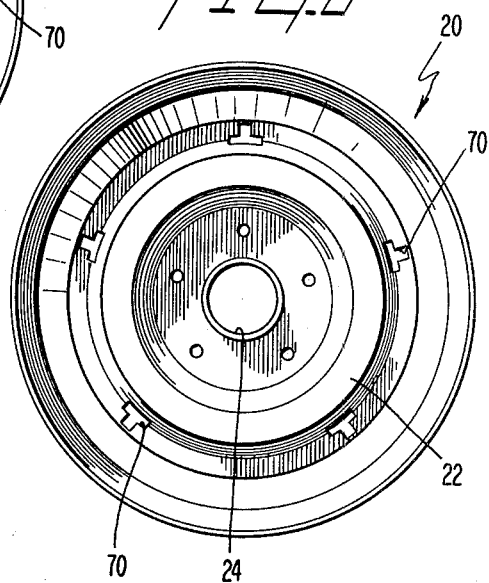
FIG. 8 is a side elevation of the outside of the wheel assembly.

The preferred connection device for the outside of the wheel assembly 20 (see FIG. 8) includes the plurality of radial slots 70 which are exposed when, for example, the hubcap is removed from the wheel assembly 20. In addition, this second connection device includes the connecting pin assembly 58 (FIG. 2) attached to the second end portion 56 of the chain assembly 38.

The pin assembly 58 preferably includes an angular body portion 98 having a pair of lateral protrusions 100, 102 extending therefrom. This angular configuration allows the chain assembly 38 to lie closely adjacent to the outside of the wheel. Preferably, the body portion 98 has a generally rectangular cross section; whereas, the protrusions 100, 102 comprise end parts of a generally cylindrical nature. The pin assembly 58 thus has a generally T-shaped configuration.

Figure 9:
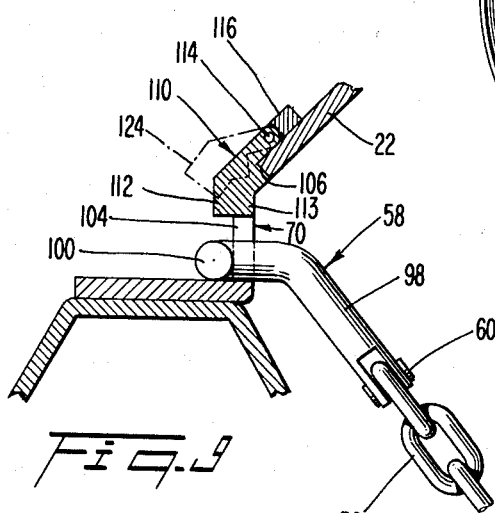
FIG. 9 is an enlarged partial cross-sectional view of the outside chain connecting device.
Figure 10:
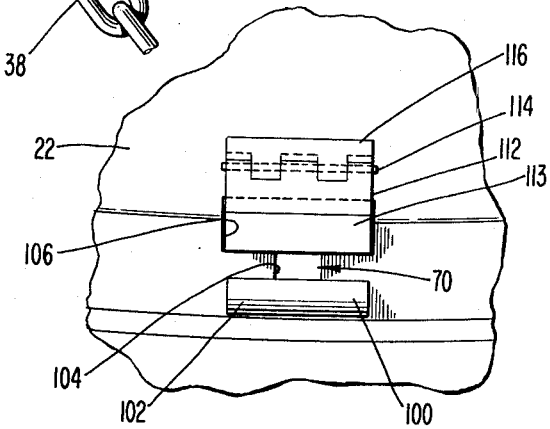
FIG. 10 is an enlarged view of the inside of the wheel assembly at the location of FIG. 9.

Each slot 70 has a generally radially extending portion 104 (see FIG. 10) and may include a circumferentially extending portion 106. The radially extending portion 104 is adapted to receive the rectangular body portion 98 of the pin assembly 58 (see FIG. 9). Thus, by dimensioning the lateral width of the radial slot portion 104 so that it is sufficiently great to permit sliding of the body portion 98, the rectangular part of the body portion will prevent rotation of the pin 58 relative to the slot portion 104.

The circumferentially extending portion 106 is positioned radially inwardly of the slot portion so that centrifugal force during rotation of the wheel assembly will tend to force the pin assembly 58 into the radial portion 104 of this slot assembly 70. In addition, the circumferentially extending portion has a lateral width which exceeds the lateral dimensions between the two protrusions 100, 102 of the pin assembly 58. In this manner, the pin assembly can be inserted into the circumferential portion and moved radially outwardly into the radial portion 104 for secure engagement.

In order to be certain that the pin assembly 58 does not inadvertently disgorge itself from the radial portion 104, a retaining plate assembly 110 may be located on the inside surface of the wheel rim 22. This retaining assembly 110 includes a pivotally mounted plate 112 which is connected by a spring hinge 114 to a mounting bracket 116. The mounting bracket 116 is securely attached, for example by welding, to the wheel rim 22 so that the hingedly connected plate portion 112 overlies the radially inner end portion the radial slot portion 104. Preferably, the retaining plate 112 also covers the circumferential portion 106 of the slot 70. Moreover, the retaining plate 112 preferably includes a projecting portion 113 shaped to conform with the slot and sized to substantially fill the slot so as to present an essentially flush exterior surface. With this arrangement, the pin assembly 58 is positively retained within the radial portion 104 of the slot and cannot disgorge itself by accidentally moving to the radially inner portion of the slot 70.

The spring hinge 114 is selected so that the retaining plate 112 is held tightly against the wheel rim 22 even when in a vertically upward posture with the pin 58 resting thereupon. In this manner, some positive action must be taken to retract the retainer plate 112 and permit withdrawal of the pin assembly 58 from the wheel rim 22.

As with the first connecting device, both ends of the chain assembly 38 may be provided with the pin assemblies which could then be received by a single radial slot, if desired.

OPERATION

The inside end of a chain assembly 38 is connected to the wheel assembly 20 by taking the mounting plate 50 and placing it in position with respect to the lug 68 (see FIG. 11). Specifically, the front edge of the plate 50 slides into the retaining assembly 90 so that the plate 50 is upwardly inclined. Then, the mounting plate 50 is then pushed forwardly against the plate 94 of the retaining assembly 90 and into the channel in front of the tongue 72 so as to compress the spring 96. This corresponds to movement in the direction of the arrow 120 (see FIG. 11). Compression of the spring 96 continues until the recesses 86, 88 of the aperture 82 are in general vertical alignment with the ears 78, 80 of the lug 68. At this point, the mounting plate 50 rotated in the angular direction 122 so that the mounting plate 50 is positioned between the tongue 72 and the rim 22.

With the mounting plate 50 in position, the insertion pressure is released and the spring 96, acting through the plate 94, engages the end of the mounting plate 50 and pushes it relative to the mounting lug 68 so that the ears 78, 80 and conforming recesses 86, 88 are no longer in vertical registry and so that end of the keyway is moved into underlying vertical relationship with respect to the tongue 72 (FIG. 12).

Then, in order to connect the second end of the chain assembly 38 to the wheel assembly 20, the pin assembly 58 is inserted into the circumferentially extending portion 106 (see FIG. 9) of the slot. By pushing against the pin assembly 58, the spring mounted retainer plate 112 moves from its normal position to a second position 124 where it will permit the protrusions 100, 102 on the end of the pin assembly 58 to pass through the wheel rim 22. Then, the square body portion 98 of the pin assembly is moved radially outwardly into engagement with the radial slot portion 104 whereupon the spring mounted plate 112 snaps back into position.

To remove the chain assembly from a wheel, the foregoing steps are merely reversed. In this connection, it will be noted that the retaining plate 112 must be physically pushed inward to permit the pin assembly 58 to be moved radially inwardly to the circumferentially extending slot portion 106 during removal.

With the chain assembly 38 fully installed on the wheel, the chain and wheel assembly will have the appearance as illustrated generally in FIG. 13.

SUMMARY OF THE MAJOR ADVANTAGES

The snow chain connection assembly provided in accordance with the present invention provides a very rapid means for automobile owners and operators to attach traction enhancing chain assemblies to the wheel for use during inclement weather conditions. In this vein, the inside connection of each chain assembly to the wheel assembly can be effected by a one hand operation. Similarly, the connection of the chain to the outside of the wheel can also be effected in a one hand operation. Accordingly, the person installing the chains does not have to reach behind dirty and/or wet tires with both hands while trying to coordinate his arm movements and simultaneously protect his clothing from becoming soiled.

Another aspect of the present invention is the universality of the chain assembly. A common set of lugs can be provided on the inside of any wheel; a common set chains can be provided for use on a wide range of vehicular tire sizes. By providing an adjustable length of the chain assembly, the chain can be stocked in a single size and yet be adaptable for use in tires in a wide variety of sizes. This universality of use is highly desirable in the commercial markets since it obviates the need for a large stock of occasionally required items.

The security with which the connections between the chain and the wheel are made is also a matter of advantageous significance. With the chains connected in a secure mechanical fashion to each side of the wheel, there is no danger that the chains will inadvertently loosen or become disengaged from the wheel causing damage to the vehicle and or loss of the chain itself.

Another feature of the invention resides in the provision of a pair of cross-chains for each set of chain connections. Thus, the number of cross-chains that can be used with a wheel is significantly increased without changing the complexity or number of chain attachments to the wheel.

It should now be apparent that there has been provided in accordance with the present invention a novel wheel and chain assembly for enhancing the traction between a wheel assembly and an underlying surface. Moreover, it will be apparent to those skilled in the art that numerous modifications, variations, substitutions and equivalents exist for features of the invention which do not materially depart from the spirit and scope of the invention. Accordingly, it is expressly intended that all such modifications, variations, substitutions and equivalents which fall within the spirit and scope of the invention as defined in the appended claims be embraced thereby.

What is claimed is:

1. An assembly for enhancing vehicle traction comprising:
- a wheel having two sides, connection means for facilitating attachment of the wheel to a vehicle, and bearing surface means for supporting the wheel on an underlying surface;
- cross chain means for increasing traction between the bearing surface and the underlying surface, including first coupling means for connecting one end of the chain means to one side of the wheel and second coupling means for connecting a second end of the chain means to the other side of the wheel; and
- the first coupling means including:
  - a lug defining a key, having a bottom surface mounted on the wheel, and having a tongue vertically spaced from the lug bottom surface and the wheel, and the tongue being directed away from the bearing surface, and
  - a socket member connected to the one end of the cross chain means, having a keyway conforming to the shape of the key and a thickness which allows the socket member to be slidably moved to a retaining position between the tongue and the wheel from a vertically aligned position of the key and keyway so as to retain the socket member relative to the wheel.

2. The assembly of claim 1 wherein the lug includes a pair of ears projecting in directions generally perpendicular to the direction of the tongue and the keyway includes recesses to accomodate the ears so as to impede accidental disengagement of the socket member from the lug.

3. The assembly of claim 1 further including retaining means mounted on the wheel in general alignment with the tongue positioned to receive at least one end portion of the socket member, the retaining means being operable to exert a resilient bias holding the socket member under the tongue.

4. The assembly of claim 3 wherein the retaining means includes a compression spring for exerting the resilient bias.

5. The assembly of claim 1 wherein:
- the second coupling means includes a pin having lateral protrusions, being connected to the second end of the chain means; and
- the wheel includes a radially extending slot which prevents passage of the pin when the protrusions are circumferentially aligned so that the protrusions and slot cooperate to connect the second end of the chain means to the wheel.

6. The assembly of claim 5 wherein:
- the slot has a T-shaped configuration with circumferential and radial portions, the circumferential portion being closer to the center of the wheel than radial portion;
- the pin protrusions define a T-shaped pin sized to pass through the circumferential portion; and
- the pin has a body with a generally rectangular cross-section that inhibits rotation of the pin when the body is received in the radial portion of the slot.

7. The assembly of claim 5 wherein the radially innermost portion of the slot is covered by a retainer plate, the plate being mounted to the wheel by a spring hinge with sufficient resilience to hold the plate against the wheel when the slot is located above the wheel center.

8. In a wheel having first and second sides, a periphery and operable to be supported on an underlying surface, an improved means for attaching traction enhancing chains to the wheel comprising:
- a plurality of lugs circumferentially spaced around one side of the wheel, each lug being on a common radius and including a tongue spaced from the wheel and extending away from the periphery;
- a corresponding plurality of radially extending slots circumferentially spaced around the wheel at a common radius, operable to retain one end of a cross chain; and
- a corresponding plurality of retainer plates, each plate covering a portion of the corresponding slot and being mounted to the wheel by a spring hinge having sufficient resilience to hold the plate against the wheel when the slot is located above the wheel center.

9. The wheel of claim 8 wherein each slot also has a circumferentially extending portion located radially inwardly of the radial portion so as to receive and retain an enlarged end portion of one chain end.

10. A traction enhancing assembly for a vehicle comprising:
- a wheel having:
  - two sides,
  - a circumferential bearing surface for supporting the wheel on an underlying surface,
  - a plurality of lugs circumferentially spaced on a common radius, each lug including a tongue and a pair of ears, the tongue being spaced from the wheel and directed away from the bearing surface, the ears projecting in directions generally perpendicular to the direction of the tongue, a key being defined by the lug tongue and ears,
  - a corresponding plurality of T-shaped slots, each having a radial portion and a circumferential portion positioned radially inwardly
  - of the radial portion; the radial portion being in general circumferential registry with a corresponding lug,
  - a corresponding plurality of retainer plates, each covering the circumferential portion of a corresponding slot and being mounted to the wheel by a spring hinge with sufficient resilient force to hold the plate against the wheel when the slot is located above the wheel center, and
  - a corresponding plurality retaining assemblies mounted on the wheel in general alignment with the tongue and including a compression spring for exerting a resilient force; and
- a corresponding plurality of chains, each chain including:
  - a pair of cross chain sections, each section having first and second ends,
  - a pair of rigid spacer links each connected to both chain sections at a side of the bearing surface,
  - a socket member connected to one end of the chain, having keyway conforming to the shape of the key, a thickness allowing the socket to be received between the tongue and the wheel; and retained under the tongue by the spring of the retainer, and
  - a T-shaped pin connected to the other end of the chain, sized to pass through the circumferential portion of the slot, and including a body with a generally rectangular cross-section that inhibits pin rotation when received by the radial portion of the slot.

* * * * *